United States Patent [19]

Pasternak et al.

[11] Patent Number: 5,037,555
[45] Date of Patent: Aug. 6, 1991

[54] DESALINATION OF WATER

[75] Inventors: Mordechai Pasternak, Spring Valley; Abraham Morduchowitz, Monsey, both of N.Y.

[73] Assignee: Texaco Inc., White Plains, N.Y.

[21] Appl. No.: 549,774

[22] Filed: Jul. 9, 1990

[51] Int. Cl.$^5$ .................. B01D 61/02; B01D 71/64
[52] U.S. Cl. .................. 210/642; 210/654; 210/500.39
[58] Field of Search .................. 435/52; 210/500.39, 210/500.37, 500.38, 649–654, 644, 634, 642

[56] References Cited

U.S. PATENT DOCUMENTS 4,732,851  3/1988  Wood et al. .................. 435/52

Primary Examiner—Frank Sever
Attorney, Agent, or Firm—Robert A. Kulason; James J. O'Loughlin; Carl G. Seutter

[57] ABSTRACT

Desalination of water is effected by use of a polyimine membrane which has been cross-linked with a combination of aliphatic and aromatic polyisocyanate or with a polycarbonyl chloride cross-linking agent.

12 Claims, No Drawings

DESALINATION OF WATER

FIELD OF THE INVENTION

This invention relates to the treatment of aqueous solutions of dissolved salts to recover solutions containing lesser concentrations of dissolved salts. More particularly it relates to the desalination of salt water.

BACKGROUND OF THE INVENTION

As is well known to those skilled in the art, it is desired to treat dilute solutions containing dissolved materials to obtain more concentrated solutions or alternatively to recover solvent (frequently water) which contains decreased concentrations of solute.

In certain locations, such as on ships or in arid geographical locations, the dilute solution of particular interest is sea water which typically contains about 3.5 w % dissolved solids usually referred to as salt. Use of this water for various purposes is severely circumscribed unless the salt content is decreased to below about 0.1 w %. For example, water containing a higher concentration of salt than this level should not be used for irrigation of crops; and potable water suitable for human consumption should contain not more than about 0.05 w % salt.

It has been found to be possible to utilize membrane systems to obtain water containing decreased content of salt. In this process, the charge liquid is brought into contact with a membrane film; and one component of the charge liquid preferentially permeates the membrane. The permeate is then recovered from the downstream side of the film.

Additional background may be obtained from (i) U.S. Pat. No. 4,411,787 to UOP as assignee of Riley; (ii) J. E. Cadotte et al *J. Macromol. Sci-chem* A15(J) P 727 (1981); (iii) L. T. Rozelle et al Chapter 12 in *Reverse Osmosis and Synthetic Membranes*. Sourirajan(Ed).

It is an object of this invention to provide a novel method for treating aqueous systems containing dissolved salts to yield an aqueous product containing decreased content of salts. Other objects will be apparent to those skilled in the art.

STATEMENT OF THE INVENTION

In accordance with certain of its aspect, this invention is directed to a method of treating a charge aqueous solution containing a soluble salt which comprises maintaining a non-porous separating membrane of thickness of 0.2-1 microns of polyimine polymer which has been cross-linked with a polyisocyanate —NCO or poly(carbonyl chloride —COCl) cross-linking agent;

maintaining a pressure drop across said non-porous separating polyimine layer;

passing a charge aqueous solution containing a soluble salt into contact with the high pressure side of said non-porous separating polyimine layer whereby at least a portion of the water in said charge aqueous solution and a lesser portion of salt pass through said non-porous separating layer of polyimine as a lean liquid containing a lesser concentration of salt than is present in said charge aqueous solution, and said charge aqueous solution is converted to a rich liquid retentate containing a greater concentration of salt than is present in said charge aqueous solution;

recovering from the low pressure side of said polyimine separating layer said lean liquid containing a lesser concentration of salt than is present in said charge aqueous solution; and recovering from the high pressure side of said polyimine separating layer said rich liquid containing a greater concentration of salt than is present in said charge aqueous solution In accordance with certain of its other aspects, this invention is directed to a non-porous separating layer of thickness of 0.2-1 microns of polyimine polymer of molecular $\overline{M}_n$ of 40,000–100,000 which has been cross-linked with a polyisocyanate —NCO or a poly(carbonyl chloride —COCl) cross-linking agent.

DESCRIPTION OF THE INVENTION THE CHARGE SOLUTION

The charge solution which may be treated by the process of this invention may be an aqueous solution containing soluble salts. The aqueous charge solution may be a process water, a wash water from e.g. a filtration operation, a hard water from a well or a water-distribution system, etc. The soluble salts may contain cations such as those of Group I (e.g. K, Na, etc.), Group II (Ba, Ca, Mg, etc.) or those of other groups. Anions which may be present may include halide, typically chloride, or sulfate, carbonate, phosphate, etc.

The advantages of this invention may be particularly effective when the charge aqueous solution is sea water. Although the composition of this liquid may vary from place to place, it typically may contain the following:

TABLE

| Element | Parts per Million (w) |
| --- | --- |
| Cl | 18,980 |
| Na | 10,561 |
| Mg | 1,272 |
| S | 884 |
| Ca | 400 |
| K | 380 |
| Br | 65 |
| C (inorg) | 28 |
| Sr | 13 |
| (SiO$_2$) | 0.01–7.0 |
| B | 4.6 |
| Si | 0.02–4.0 |
| C (org) | 1.2–3.0 |
| Al | 0.16–1.9 |
| F | 1.4 |

Many other elements may be present in amounts each less than about 1 ppm. See Handbook of Chemistry and Physics (44 Ed) 1962, page 3488.

Commonly sea water is considered as being a dilute solution of sodium chloride containing about 3.5 w % thereof.

THE MEMBRANE ASSEMBLY

Practice of the process of this invention may be carried out by use of a composite structure which in one preferred embodiment may include a carrier layer which provides mechanical strength, a porous support layer, and a separating layer or membrane across which reverse osmosis occurs.

The composite structure of this invention includes a multi-layer assembly which in the preferred embodiment preferably includes a porous carrier layer which provides mechanical strength and support to the assembly.

THE CARRIER LAYER

This carrier layer, when used, is characterized by its high degree of porosity and mechanical strength. It may be fibrous or non-fibrous, woven or non-woven. In the preferred embodiment, the carrier layer may be a porous, flexible, non-woven fibrous polyester.

A preferred non-woven polyester carrier layer may be formulated of non-woven thermally-bonded strands of polyester and characterized by a fabric weight of 80±8 grams per square yard, a thickness of 4.2±0.5 mils, a tensile strength (in the machine direction) of 31 psi and (in across direction) of 10 psi, and a Frazier air permeability of 6 cu.ft/min./sq. ft. @ 0.5 inches of water.

THE POROUS SUPPORT LAYER

The porous support layer useful in practice of the process of this invention may be preferably formed of a sheet of polysulfone polymer. Typically the polysulfone may be of thickness of 40-80 microns, say 50 microns and of molecular weight $\overline{M}_n$ of 5,000–100,000, preferably 20,000–60,000, say 40,000. The polysulfone is preferably characterized by a pore size of less than about 500 Å and typically about 250 Å. This corresponds to a molecular weight cut-off of less than about 80,000, typically about 60,000.

The sulfone polymers which may be employed may include those made from cumene containing isopropylidene groups in the backbone; e.g.

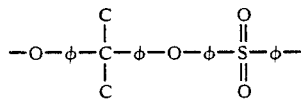

These isopropylidene sulfones, containing as repeating units ether-aromatic-isopropylidene-aromatic-ether-aromatic-sulfone aromatic groups may typically have a molecular weight $\overline{M}_n$ of 15,000–30,000, a water absorption (at 20° C.) of about 0.85 w %, a glass transition temperature of 449° K., a density of 1.25 mg/m$^3$, tensile strength (at 20° C.) at yield of 10,000 psi, and a coefficient of linear thermal expansion of $1.6\times 10^{-5}$ mm/mm° C.

It is found, however, that the preferred sulfone polymers which may be employed in practice of the process of this invention, may include those which are free of isopropylidene moieties in the backbone chain and wherein the phenylene groups in the backbone are bonded only to ether oxygen atoms and to sulfur atoms These preferred polymers, which may typically be prepared from

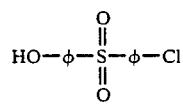

may be characterized by a backbone containing the following repeating groups:

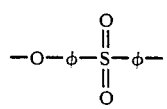

A preferred sulfone polymer may be a polyether sulfone which is free of isopropylidene moieties in the backbone chain and wherein the phenylene groups in the backbone are bonded only to ether-oxygen atoms and to sulfur atoms. This polymer may be characterized by molecular weight $\overline{M}_n$ of 25,000, water absorption @ 20° C. of 2.1 w %, glass transition temperature of 487° K., tensile strength at yield of 2,200 psig at 20° C.; and coefficient of linear thermal expansion of $5.5\times 10^{-5}$ mm/mm/° C. This polymer has a molecular weight cut-off of about 60,000 and has a pore size of about 250 Å.

THE SEPARATING LAYER

The separating layer which permits attainment of the separation in accordance with this invention includes a non-porous film, membrane, or separating layer of 0.1–1, say about 0.5 microns thickness of polyimine polymer of molecular weight $\overline{M}_n$ of 40,000–100,000, say about 60,000 which is cross-linked by urea or amide linkages.

Polyimine polymers are characterized by the presence of recurring —N—R''- groups as integral parts of the main polymer chain.

Typical structural formulae of linear polyimines may be represented as

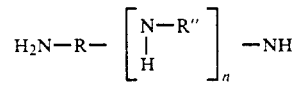

wherein R'' represent hydrocarbon chains between functional groups in the reactants and represents the degree of polymerization or number of recurring groups in the polymer chain.

In the above formula, R'' may be a hydrocarbon group selected from the group consisting of alkylene, aralkylene, cycloalkylene, arylene, alkarylene, alkenylene, and alkynylene including such radicals when inertly substituted. When R'' is alkylene, it may typically be methylene, ethylene, n-propylene, isopropylene, n-butylene, i-butylene, secbutylene, amylene, octylene, decylene, octadecylene, etc. When R'' is aralkylene, it may typically be benzylene, betaphenylethylene, etc. When R'' is cycloalkylene, it may typically be cyclohexylene, cycloheptylene, cyclooctylene, 2-methylcycloheptylene, 3-butylcyclohexylene, 3-methylcyclohexylene, etc. When R'' is arylene, it may typically be phenylene, naphthylene, etc. When R'' is alkarylene, it may typically be tolylene, xylylene, etc. When R'' is alkenylene, it may typically be vinylene, allylene, 1-butenylene, etc. When R'' is alkynylene, it may typically be ethynylene, propynylene, butynylene, etc. R'' may be inertly substituted i.e. it may bear a non-reactive substituent such as alkyl, aryl, cycloalkyl, ether, halogen, nitro, etc. Typically inertly substituted R'' groups may include 3-chloropropylene, cyclohexylene, p-chlorophenylene, p-chlorobenzylene, 3-chloro-5-methylphenylene, etc. The preferred R'' groups may be lower alkylene, i.e. $C_1$-$C_{10}$ alkylene, groups including e.g. methylene, ethylene, n-propylene, i-propylene, butylene, amylene, hexylene, octylene, decylene, etc. R'' may preferably be ethylene —$CH_2CH_2$—.

Illustrative polyimines include those of molecular weight $\overline{M}_n$ of 40,000–100,000 say 60,000.

These compositions may be available commercially. Typical of such commercial products may be (the first listed being preferred):

TABLE

A. Cordova Chemical Company Corcat P-600 brand of polyethyleneimine ($\overline{M}_n$ of 60,000) in 33 w % aqueous solution - Brookfield Viscosity @ 25° C. of 5000 Cp, Sp. Gr. @ 25 of 1.04–1.06, pH of 10–11 having the following

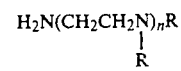

wherein R is 

(containing 30% primary, 40% secondary, and 30% tertiary amines).

B. Tydex 12 brand of membrane (of Dow Chemical) polyethyleneimine resin ($\overline{M}_n$ of 50,000) in 30 w % aqueous solution—having the same basic formula as Corcat P-600.

These polymers are generally available as a membrane of thickness of microns, say about 0.1–0.5 microns.

TREATMENT OF THE SEPARATING LAYER

Treatment of the membrane prior to use in the process of the instant invention may include contacting at least the surface which is to be in contact with the charge solution with, as cross-linking agent, a polyisocyanate —NCO or a poly(carbonyl chloride —COCl).

The polyisocyanate —NCO cross-linking agents (which react with the polyimines by addition reaction to form urea bonds) may typically be characterized by the formula OCN-R"—CNO.

In the above formula, R" may be a hydrocarbon group selected from the group consisting of alkylene, aralkylene, cycloalkylene, arylene, and alkarylene, including such radicals when inertly substituted. When R" is alkylene, it may typically be methylene, ethylene, n-propylene, isopropylene, n-butylene, i-butylene, sec-butylene, amylene, octylene, decylene, octadecylene, etc. When R" is aralkylene, it may typically be benzylene, beta-phenylethylene, etc. When R" is cycloalkylene, it may typically be cyclohexylene, cycloheptylene, cyclooctylene, 2-methylcycloheptylene, 3butylcyclohexylene, 3-methylcyclohexylene, etc. When R" is arylene, it may typically be phenylene, napthene, etc. When R" is alkarylene, it may typically be tolylene, xylylene, etc. R" may be inertly substituted i.e. it may bear a non-reactive substituent such as alkyl, aryl, cycloalkyl, ether, etc. Typically inertly substituted R" groups may include 3-chloropropylene, 2-ethoxyethylene, carboethoxymethylene, 4methyl cyclohexylene, etc. The preferred R" groups may be lower alkylene, i.e. C1-C$_{10}$ alkylene, groups including e.g. methylene, ethylene, n-propylene, i-propylene, butylene,amylene, hexylene, octylene, decylene, etc. R" may preferably be (CH$_2$)$_6$. In another preferred embodiment R" may be phenylene with the —NCO groups, preferably para- or more preferably meta-.

Illustrative polyisocyanate cross-linking agents which may be employed may include the following, the first listed being preferred:

TABLE m-phenylene diisocyanate
p-phenylene diisocyanate
hexamethylene diisocyanate
toluene-2,4-diisocyanate The polycarbonyl chloride —COCl cross-linking agents (which react with the imine groups by condensation reaction to form amide bonds) may typically be characterized by the formula

R" may be set forth supra.

Illustrative polycarbonyl chloride cross-linking agents may include the following, the first listed being preferred:

TABLE isophthaloyl dichloride
terephthaloyl dichloride
suberoyl dichloride
benzene tricarbonyl chloride In practice of the invention, the membrane may be treated with cross-linking agent The latter may be employed as a 0.1 w %–0.8 w %, say 0.4 w % solution in solvent, typically a hydrocarbon such as hexane. Contact may be at 20° C.–40° C., say 25° C. for 15–60 seconds, say 30 seconds. Thereafter the membrane may be cured at 110° C.–145° C., say 125° C. for 10–20 minutes, say 15 minutes.

THE COMPOSITE MEMBRANE

It is a feature of this invention that it may utilize a composite membrane which comprises (i) an optional carrier layer characterized by porosity and mechanical strength, for supporting a porous support layer and a separating layer (ii) a preferably porous support layer such as a polysulfone membrane of molecular weight of 5,000–100,000 of thickness of 10–80 microns, and of molecular weight cut-off of 25,000–100,000, and (iii) as a non-porous separating layer a polyimine of molecular weight $\overline{M}_n$ of 40,000–100,000, which has been cross-linked with a polyisocyanate —NCO or a polycarbonyl chloride —COCl.

The composite membrane of this invention may be utilized in various configurations. It is, for example, possible to utilize the composite in a plate-and-frame configuration in which separating layers may be mounted on the porous support layer with the carrier layer.

It is possible to utilize a spiral wound module which includes a non-porous separating layer mounted on a porous support layer and a carrier layer, the assembly being typically folded and bonded or sealed along all the edges but an open edge - to form a bag-like unit which preferably has the separating layer on the outside A cloth spacer, serving as the permeate or discharge channel is placed within the bag-like unit. The discharge channel projects from the open end of the unit.

There then placed on one face of the bag-like unit, adjacent to the separating layer, and coterminous therewith, a feed channel sheet - typically formed of a plastic net.

The so-formed assembly is wrapped around a preferably cylindrical conduit which bears a plurality of perforations in the wall - preferably in a linear array which is as long as the width of the bag-like unit. The projecting portion of the discharge channel of the bag-like unit is placed over the perforations of the conduit; and the bag-like unit is wrapped around the conduit to form a spiral wound configuration. It will be apparent that, although only one feed channel is present, the single feed channel in the wound assembly will be adjacent to two faces of the membrane layer. The spiral wound configuration may be formed by wrapping the assembly around the conduit a plurality of times to form a readily handleable unit. The unit is fitted within a shell (in manner comparable to a shell-and-tube heat exchanger) provided with an inlet at one end and an outlet at the other. A baffle-like seal between the inner surface of the shell and the outer surface of the spiral-wound unit prevents fluid from bypassing the operative membrane system and insures that fluid enters the system principally at one end. The permeate passes from the feed channel, into contact with the separating layer and thence therethrough, into the permeate channel and thence therealong to and through the perforations in the conduit through which it is withdrawn as net permeate.

In use of the spiral wound membrane, charge liquid is permitted to pass through the plastic net which serves as a feed channel and thence into contact with the non-porous separating membranes. The liquid which does not pass through the membranes is withdrawn as retentate. The liquid or vapor which permeates the membrane passes into the volume occupied by the permeate spacer and through this permeate channel to the perforations in the cylindrical conduit through which it is withdrawn from the system.

In another embodiment, it is possible to utilize the system of this invention as a tubular or hollow fibre. In this embodiment, the polysulfone porous support layer may be extruded as a fine tube with a wall thickness of typically 0.001-0.1 mm. The extruded tubes are passed through a bath of polyethyleneimine which is cross-linked and cured in situ. A bundle of these tubes is secured (with an epoxy adhesive) at each end in a header; and the fibres are cut so that they are flush with the ends of the header. This tube bundle is mounted within a shell in a typical shell-and-tube assembly.

In operation, the charge liquid is admitted to the tube side and passes through the inside of the tubes and exits as retentate. During passage through the tubes, permeate passes through the non-porous separating layer and permeate is collected in the shell side.

In this embodiment, the porous support layer may be omitted; and the separating layer is extruded and thereafter cross-linked and cured in situ prior to mounting in the headers.

REVERSE OSMOSIS

It is a feature of the non-porous cross-linked polyimine separating layer that it is found to be particularly effective when used in a Reverse Osmosis Process. In reverse osmosis, a charge liquid containing a more permeable and a less permeable component is maintained in contact with a non-porous separating layer; and a pressure drop is maintained across that layer. A portion of charge liquid dissolves into the membrane and diffuses therethrough. The permeate passes through the membrane and exits as a liquid.

It is a feature of this invention that the novel membrane may be particularly useful in reverse osmosis processes for desalination of aqueous solutions.

In practice of the process of this invention, the charge aqueous solution in liquid phase at 20° C.-60° C., say 25° C. may be passed into contact with the non-porous separating layer of the membrane of this invention. A pressure drop of about 500-1000, say 750 psig is commonly maintained across the membrane. Typically, the feed or charge side of the membrane is at pressure of about 750 psig and the permeate or discharge side of the membrane is at about atmospheric pressure.

The permeate which passes through the membrane includes water and a substantially decreased concentration of salts from the charge liquid. Typically, the permeate contains water containing decreased content of solute. Permeate is recovered in liquid phase.

Reverse osmosis may typically be carried out at a flux of 20-90, say 40 gallons per square foot per day. Typically, the units may have a rejection (measured in terms of 100 times the weight of salt retained in the Retentate divided by the weight of salt in the Feed) of more than 85% and typically 85-99.3%, say as high as 99+%.

Practice of the process of this invention will be apparent to those skilled in the art from inspection of the following examples.

DESCRIPTION OF SPECIFIC EMBODIMENTS

EXAMPLE 1

In this example, which represents the best mode presently known of carrying out the process of this invention, the selective separating layer is mounted on a porous support layer of a commercially available (from Film Tec Corp) support containing a non-woven polyester backing as carrier layer bearing, as a porous support layer, a microporous polysulfone layer of molecular weight cut-off of 60,000.

The selective separating layer (made of Corcat P-600 polyethyleneimine of the Table supra, of molecular weight $\overline{M}_n$ of 60,000) is of thickness of about 0.5 microns.

The membrane assembly containing the microporous polysulfone of molecular weight cut-off of 60,000 as porous support layer, and the non-woven polyester backing as carrier layer (total area of Ca 30 cm$^2$) is contacted with 1 w % aqueous solution of the Corcat P-600 brand of polyethyleneimine for 2 minutes. Excess solution is poured off. Cross-linking agents (m-phenylene diisocyanate in amount of 0.2 w % in hexane and hexamethylene diisocyanate in amount of 0.1 w % in hexane) are added and contacts the film for 30 seconds. The system is then cured at 125° C. for 15 minutes The membrane is mounted in a flow cell through which is passed an aqueous 0.15 w % sodium chloride solution at 25° C. at 0.5 GpM (qallons per minute). Pressure on the inlet side of the cell is 750 psig. Rejection is 93.9% and Flux through the membrane is 76.6 gallons per square foot per day.

EXAMPLES 2-15

In this series of examples, the procedure of Example 1 is followed except that the crosslinking agent is as noted in the following Table. The crosslinking agents are as follows:

TABLE mPDI meta-phenylene diisocyanate pPDI para-phenylene diisocyanate
IPC isophthaloyl dichloride
TPC terephthaloyl dichloride
HDI hexamethylene diisocyanate
SDC suberoyl dichloride In each instance, the assembly is tested for Flux and Rejection in a flow cell system at 750 psig and 25° C. using a charge aqueous solution containing 0.15 w % sodium chloride.

TABLE

| Example | Crosslinking Agent | Concentration wt. % | Flux | Rejection |
| --- | --- | --- | --- | --- |
| 2 | mPDI | 0.4 | 21.1 | 99.3 |
| 3 | IPC | 0.8 | 32.0 | 92.8 |
| 4 | HDI | 0.4 | 71.0 | 89.7 |
| 5 | SDC | 0.8 | 91.7 | 86.1 |
| 6 | mPDI | 0.2 | 46.7 | 98.3 |
| 7 | HDI | 0.3 | 88.3 | 80.7 |
| 8 | mPDI + HDI | 0.2 + 0.1 | 76.6 | 93.9 |
| 9 | IPC | 0.4 | 79.5 | 82.9 |
| 10 | SDC | 0.6 | 132.2 | 80.2 |
| 11 | IPC + SDC | 0.2 + 0.2 | 46.0 | 93.4 |
| 12 | pPDI | 0.3 | 53.6 | 89.1 |
| 13 | TPC | 0.6 | 91.7 | 86.1 |

Comparison of Examples 2 and 3 shows that with respect to Rejection, the aromatic isocyanate cross-linked barrier (Example 2) gives a Rejection of 99.3% at Flux of 21.1. This is a better Rejection than the 92.8% of Example 3 which does yield a somewhat increased Flux with the carbonyl chloride cross-linked barrier.

Similarly, comparison of Examples 4-5 shows that the aliphatic isocyanate cross-linked barrier (Example 4) gives greater Rejection although lower Flux than is attained using the aliphatic carbonyl chloride cross-linked barrier of Example 5.

From a comparison of Examples 2, 4, 6, 7 and 8, it may be noted that the mPDI of Examples 2 and 6, which are characterized by an aromatic backbone, show high Rejection but low Flux while the HDI of Examples 4 and 7 are characterized by a lower Rejection and a higher Flux. Use of a mixture of these two cross-linking agents yields the best combination of high Rejection and high Flux which is overall better than that attained with either mPDI or HDI.

Comparison of Examples 3, 5, 9, 10 and 11 again shows that selected combinations may yield improvements in both Rejection and Flux.

Comparison of Examples 2-3 and 12-13 shows that the meta-crosslinking agents of Examples 2 and 3 give high Rejection whereas the para-crosslinking agents of Examples 12 and 13 show higher Flux.

Although this invention has been illustrated by reference to specific embodiments, it will be apparent to those skilled in the art that various changes and modifications may be made which clearly fall within the scope of this invention.

We claim:

1. The method of treating a charge aqueous solution containing a soluble salt which comprises
    maintaining a non-porous separating membrane of thickness of 0.2-1 microns of polyimine polymer which has been cross-linked with a polyisocyanate —NCO or a poly(carbonyl chloride —COCl) cross-linking agent sufficient for providing properties for at least desalinating salt water;
    maintaining a pressure drop across said non-porous separating polyimine layer;
    passing a charge aqueous solution containing a soluble salt into contact with the high pressure side of said non-porous separating polyimine layer whereby at least a portion of the water in said charge aqueous solution and a lesser portion of salt pass through said non-porous separating layer of polyimine as a lean liquid containing a lesser concentration of salt than is present in said charge aqueous solution, and said charge aqueous solution is converted to a rich liquid retentate containing a greater concentration of salt than is present in said charge aqueous solution;
    recovering from the low pressure side of said polyimine separating layer said lean liquid containing a lesser concentration of salt than is present in said charge aqueous solution; and
    recovering from the high pressure side of said polyimine separating layer said rich liquid containing a lesser concentration of salt than is present in said charge aqueous solution.

2. The method claimed in claim 1 wherein said cross-linking agent contains an aliphatic cross-linking agent and an aromatic cross-linking agent.

3. The method claimed in claim 1 wherein said cross-linking agent contains meta-phenylene diisocyanate and hexamethylene diisocyanate.

4. The method claimed in claim 1 wherein said cross-linking agent contains isophthaloyldichloride and suberoyl dichloride.

5. The method claimed in claim 1 wherein said cross-linking agent contains
    m-phenylene diisocyanate
    p-phenylene diisocyanate
    hexamethylene diisocyanate or
    m-toluene diisocyanate.

6. The method claimed in claim 1 wherein said cross-linking agent contains
    isophthaloyl dichloride
    terephthaloyl dichloride or
    suberoyl dichloride.

7. The method claimed in claim 1 wherein said polyimine is polyethyleneimine.

8. The method claimed in claim 1 wherein said polyimine is a polyethyleneimine of molecular weight $\overline{M}_n$ of 40,000-100,000.

9. The method claimed in claim 1 wherein said polyimine is a polyethyleneimine of molecular $\overline{M}_n$ of about 60,000.

10. The method claimed in claim 1 wherein said polyimine is cross-linked with a diisocyanate.

11. The method of treating a charge aqueous solution containing a soluble salt which comprises
    maintaining a non-porous separating membrane of thickness of 0.2-1 microns of polyethyleneimine which has been cross-linked with meta-phenylene diisocyanate and hexamethylene diisocyanate sufficient for providing properties for at least desalinating salt water;
    maintaining a pressure drop across said non-porous separating polyimine layer;
    passing a charge aqueous solution containing a soluble salt into contact with the high pressure side of said non-porous separating polyethyleneimine layer whereby at least a portion of the water in said charge aqueous solution and a lesser portion of salt pass through said non-porous separating layer of polyethyleneimine as a lean liquid containing a lesser concentration of salt than is present in said charge aqueous solution, and said charge aqueous solution is converted to a rich liquid containing a greater concentration of salt than is present in said charge aqueous solution;

recovering from the low pressure side of said polyethyleneimine separating layer said lean liquid containing a lesser concentration of salt than is present in said charge aqueous solution; and recovering from the high pressure side of said polyethyleneimine separating layer said rich liquid containing a lesser concentration of salt than is present in said charge aqueous solution.

12. The method of claim 11 wherein said charge aqueous solution is a sea water.

* * * * *